(12) United States Patent
Camuffo

(10) Patent No.: US 9,264,188 B2
(45) Date of Patent: Feb. 16, 2016

(54) APPARATUS AND A METHOD FOR DETERMINING INFORMATION ON AN AMPLITUDE ERROR OF A TRANSMIT SIGNAL

(71) Applicant: Intel IP Corporation, Santa Clara, CA (US)

(72) Inventor: Andrea Camuffo, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/591,210

(22) Filed: Jan. 7, 2015

(65) Prior Publication Data

US 2015/0244504 A1 Aug. 27, 2015

(30) Foreign Application Priority Data

Feb. 21, 2014 (DE) .......................... 10 2014 102 310

(51) Int. Cl.
*H04L 1/24* (2006.01)
*H04L 1/00* (2006.01)
*H04L 1/20* (2006.01)

(52) U.S. Cl.
CPC .............. *H04L 1/243* (2013.01); *H04L 1/0003* (2013.01); *H04L 1/206* (2013.01)

(58) Field of Classification Search
CPC ....................................................... H04L 1/243
USPC ....................................................... 375/285
See application file for complete search history.

(56) References Cited

U.S. PATENT DOCUMENTS

| 5,903,823 A * | 5/1999 | Moriyama et al. ............ 455/126 |
| 8,446,980 B2 | 5/2013 | Ashita |
| 2003/0104792 A1 | 6/2003 | Doi |
| 2008/0211576 A1* | 9/2008 | Moffatt et al. ................ 330/149 |

FOREIGN PATENT DOCUMENTS

WO 0247249 A2 6/2002

\* cited by examiner

*Primary Examiner* — Michael Neff
(74) *Attorney, Agent, or Firm* — Eschweiler & Associates, LLC

(57) ABSTRACT

An apparatus for determining information on an amplitude error of a transmit signal includes at least one transmit path module, at least one feedback receive path module and at least one error determining module. The transmit path module generates a high frequency transmit signal based on a baseband transmit signal. The feedback receive path module generates a baseband feedback signal based on a high frequency feedback signal derived from the high frequency transmit signal. Further, the error determining module determines an error signal indicating information associated with an amplitude error of the high frequency transmit signal based on the baseband transmit signal and the baseband feedback signal. The error determining module comprises a feedback loop. This feedback loop of the error determining module comprises a feedback loop processing module. The feedback loop processing module generates a feedback loop output signal based on a feedback loop input signal and the baseband transmit signal.

23 Claims, 7 Drawing Sheets

APPARATUS AND A METHOD FOR DETERMINING INFORMATION ON AN AMPLITUDE ERROR OF A TRANSMIT SIGNAL

CROSS REFERENCE TO RELATED APPLICATIONS

This application claims priority to German Patent Application number 10 2014 102 310.2 filed on Feb. 21, 2014 and is hereby incorporated in its entirety.

FIELD

The present disclosure relates to the determination of deviations of properties of signals from desired properties and in particular to an apparatus and a method for determining information on an amplitude error of a transmit signal.

BACKGROUND

Electrical signals often contain undesired signal portions (e.g. due to nonlinearity or mismatch) or deviations of signal portions from desired properties (e.g. amplitude or power) caused by the signal processing and/or varying environmental conditions. For example, an uplink cellular transmission may be confronted with signals having strong amplitude modulation and different modulation schemes, showing a variety of different crest factors and also different spectral contents. For example, the signals may range from very narrowband signals like LTE (Long Term Evolution) with single resource block occupation to LTE 20 with full allocation. It is desired to provide signals with properties as close as possible to desired signal properties.

SUMMARY

There is a potential demand to provide a concept for determining information on an amplitude error of a transmit signal with low effort and/or high accuracy.

This demand may be satisfied by an apparatus or method according to present disclosure.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
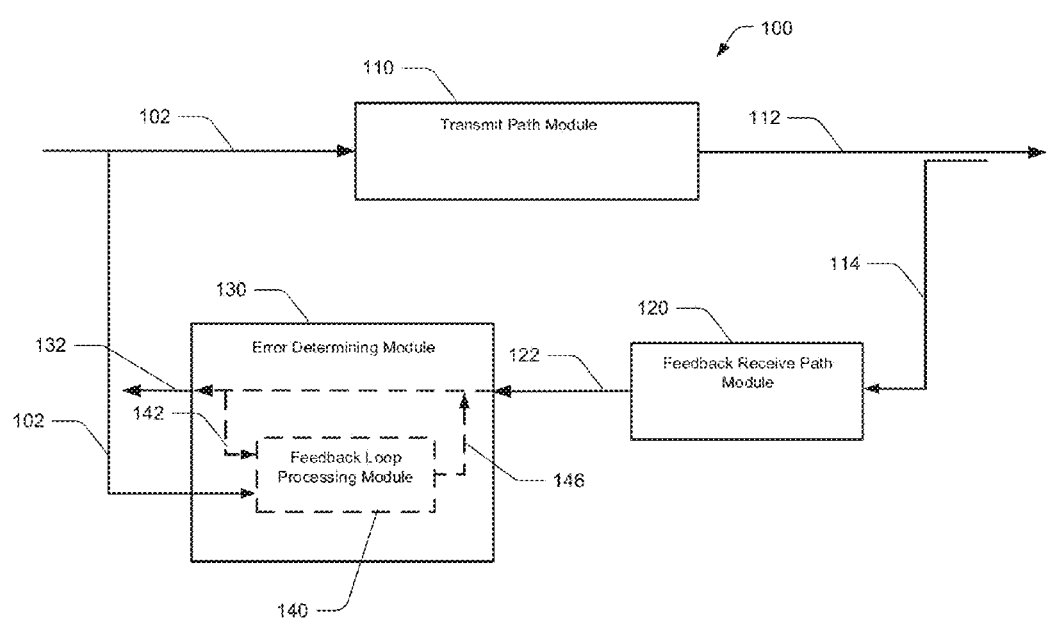
FIG. 1 shows a block diagram of an apparatus for determining information on an amplitude error of a transmit signal.

FIG. 1 shows a block diagram of an apparatus 100 for determining information on an amplitude error of a transmit signal according to an example. The apparatus 100 comprises at least one transmit path module 110, at least one feedback receive path module 120 and at least one error determining module 130. The transmit path module 110 generates a high frequency transmit signal 112 based on a baseband transmit signal 102. The feedback receive path module 120 generates a baseband feedback signal 122 based on a high frequency feedback signal 114 derived from the high frequency transmit signal 112. Further, the error determining module 130 determines an error signal 132 indicating information associated with an amplitude error of the high frequency transmit signal based on the baseband transmit signal 102 and the baseband feedback signal 122. The error determining module 130 comprises a feedback loop. This feedback loop of the error determining module 130 comprises a feedback loop processing module 140. The feedback loop processing module 140 generates a feedback loop output signal 146 based on a feedback loop input signal 142 and the baseband transmit signal 102.

By considering the baseband transmit signal 102 within the feedback loop of the error determining module 130, an error signal indicating an information on an amplitude error of the high frequency transmit signal 112 may be determined with low effort. For example, the generation of a reference error signal based on the baseband transmit signal, which may be compared with an error signal determined based on the feedback receive signal, may be avoided by considering the baseband transmit signal 102 directly within the feedback loop of the error determining module. Further, the accuracy of the determination of the amplitude error may be improved by the direct consideration of the baseband transmit signal 102 within the feedback loop of the error determining module 130. Furthermore, an amplitude error of the high frequency transmit signal 112 may be determined very fast due to the consideration of the baseband transmit signal 102 within the feedback loop of the error determining module 130, for example.

An amplitude of the high frequency transmit signal 112 provided to an antenna module for transmitting the high frequency transmit signal 112 to a receiver may deviate from a desired amplitude due to various influences (e.g. varying environmental conditions). Such an amplitude error of the high frequency transmit signal 112 may be detected by analyzing a feedback signal derived from the high frequency transmit signal 112.

The transmit path module 110 may comprise at least an up-conversion module (e.g. comprising a mixer and/or a Radio Frequency Digital-to-Analog Converter RFDAC) up-converting the baseband transmit signal 102 to generate the high frequency transmit signal 112. Further, the transmit path module 110 may comprise further signal processing modules (e.g. Power-Amplifier, filter, digital-to-analog converter and/or a local oscillator module). The baseband transmit signal 102 may be a component signal of the complex valued baseband transmit signal (e.g. amplitude signal of a polar-modulated baseband transmit signal) or a complex valued baseband transmit signal (e.g. comprising in-phase and quadrature-phase signal). For example, the amplitude of a polar modulated baseband transmit signal may vary between succeeding symbols to be transmitted. In order to provide information of a desired amplitude variation caused by different symbols to be transmitted, the baseband transmit signal or a signal derived from the baseband transmit signal is considered within the feedback loop of the error determining module 130.

The apparatus 100 may comprise an antenna module connected to the transmit path module 110 or may be connectable to an external antenna module for transmitting the high frequency transmit signal 112 to an external receiver.

Further, the apparatus 100 may comprise a coupling module between the transmit path module 110 and an antenna module for providing a high frequency feedback signal 114 based on the high frequency transmit signal 112. For example, the coupling module may comprise an element capacitive and/or inductively coupled to an electrical connection between the transmit path module 110 and the antenna module so that a high frequency feedback signal 114 proportional to the high frequency transmit signal 112 may be provided at an output of the element. For example, a directional coupler may be arranged within the transmit path (e.g. between a Power-Amplifier of the transmit path module and an antenna module) providing the high frequency feedback signal 114 at a coupled port).

The feedback receive path module 120 may comprise at least a down conversion module (e.g. comprising a mixer and/or a Radio Frequency Analog-to-Digital Converter) for down-converting the high frequency feedback signal 114 from the radio frequency domain to the baseband domain to generate a baseband feedback signal 122. The feedback receive path module 120 may comprise one or more further signal processing modules (low noise amplifier, Analog-to-Digital Converter, filter and/or coordinate conversion module) for processing the high frequency feedback signal and/or the baseband feedback signal, for example. In this way, a feedback signal may be provided comprising an amplitude corresponding to or proportional to an amplitude of the high frequency transmit signal 112 (e.g. comprising desired and undesired amplitude variations).

The error determining module 130 determines the error signal 132 based on the baseband transmit signal 102 and the baseband feedback signal 122. The error signal indicates information associated with an amplitude error of the high frequency transmit signal 112. An amplitude error of the high frequency transmit signal 112 may be a deviation of the amplitude of the high frequency transmit signal 112 from a desired amplitude. The information associated with an amplitude error may be represented in various ways depending on the information desired or sufficient for the further usage or processing of the error signal 132. For example, it may be sufficient to indicate whether an amplitude error exceeds a pre-defined threshold or a magnitude or size of the amplitude error may be indicated. Therefore, various kinds of information may represent an information associated with an amplitude error of the high frequency transmit signal 112. For example, the error signal 132 may comprise information on an absolute or relative magnitude of an amplitude error (e.g. a value indicating a percentage or a factor regarding a desired amplitude) or a relative or absolute amplitude difference to a desired amplitude of the high frequency transmit signal 112 or may be an information to be used to determine one of the values mentioned before, for example.

The error determining module 130 comprises a feedback loop. In other words, the signal path between an input of the error determining module 130 receiving the baseband feedback signal 112 (or a signal derived from the baseband feedback signal) and an output providing the error signal 132 comprises a feedback loop path implementing a feedback of a signal derived at a node closer to the output of the error determining module 130 and provided to a node closer to the input of the error determining module 130 after processing by the feedback loop processing module 140.

The feedback loop processing module 140 is arranged within this feedback loop of the error determining module 130. The feedback loop processing module 140 generates a feedback loop output signal 146 to be provided to the node closer to the input of the error determining module 130 based on a feedback loop input signal 142 derived or obtained at the node closer to the output of the error determining module 130 and based on the baseband transmit signal 102. For this, the baseband transmit signal 102 itself or a signal derived from the baseband transmit signal 102 (e.g. a delayed version of the baseband transmit signal to compensate a path delay through the transmit path module and the feedback receive path module) is provided to the feedback loop processing module 140, for example. In other words, a baseband signal comprising information on the baseband transmit signal 102, which may be the baseband transmit signal 102 itself or a signal derived from the baseband transmit signal 102 is used by the feedback loop processing module 140 to generate the feedback loop output signal 146. For example, a baseband signal considered by the feedback loop processing module 140 derived from the baseband transmit signal 102 may be only processed in the baseband domain (e.g. in contrast to the baseband feedback signal, which is derived from an high frequency signal).

A feedback loop processing module 140 may consider the baseband signal comprising information on the baseband transmit signal 102 in various ways for generating the feedback loop output signal 146. For example, the feedback loop processing module 140 may comprise a combiner module (e.g. multiplier module) generating a combined (or multiplier) output signal based on the feedback loop input signal 142 and the baseband transmit signal 102. For example, the multiplier module may multiply the feedback loop input signal (e.g. directly or after pre-processing) with a baseband signal comprising information on the baseband transmit signal 102 (e.g. the baseband transmit signal itself or a signal derived from the baseband transmit signal) in the baseband domain to generate the multiplier output signal.

For example, the error signal 132 may be determined without using a signal divider due to the consideration of the baseband transmit signal 102 by a multiplier module within the feedback loop processing module 140 of the error determining module 130. In this way, the current consumption and/or the hardware effort for determining the error signal 132 may be reduced.

The error determining module 130 may determine the error signal 132 by analog signal processing or by digital signal processing. For example, the error determining module 130 may be located in the digital domain. In other words, the error determining module 130 may be implemented by a digital electrical circuit. By implementing the error determining module 130 in the digital domain, the current consumption and/or the hardware effort for the error determining module 130 may be kept low, for example.

The apparatus 100 or a baseband processor connected to the apparatus 100 may use the determined error signal 132 to assess a quality of the provided high frequency transmit signal 112 or the apparatus 100 may use the error signal 132 to compensate or reduce a deviation of the amplitude of the high frequency transmit signal 112 from a desired amplitude, for example. For example, the apparatus 100 may comprise a (amplitude) control module controlling an amplitude of the high frequency transmit signal 112 based on the error signal 132. The (amplitude) control module may be part of the transmit path module 110 or may be connected to the transmit path module 110, for example.

The control of the amplitude of the high frequency transmit signal 112 may be applied during the whole operating time of the apparatus 100 or may be activated or deactivated depending on various parameters. In other words, the apparatus 100 may comprise a loop control module activating or deactivating an adaptation of an amplitude of the high frequency transmit signal 112 based on the error signal 132 depending on one or more pre-defined parameters, for example. For example, the loop control module may deactivate the adaptation of the amplitude of the high frequency transmit signal 112, if a current power of the high frequency transmit signal 112 is below a pre-defined power threshold. In this way, the amplitude adaptation may be deactivated, if the signal strength or signal amplitude of the high frequency feedback signal is too low for the feedback receive module 120 to provide a baseband feedback signal 122 with sufficient quality or too low for the determination of an accurate error signal 132. Further, the adaptation may be activated again, if the power of the high frequency transmit signal 112 rises above the predefined power threshold later on, for example.

As already mentioned, the baseband transmit signal 102 may be an amplitude signal or the amplitude component of a polar-modulated baseband transmit signal. Further, the baseband feedback signal 122 may be an amplitude signal or amplitude component of a polar-modulated baseband feedback signal. A polar-modulated baseband signal may be a complex valued signal comprising an amplitude component and a phase component.

The apparatus 100 may be able to determine an accurate information on an amplitude error very fast. For example, the apparatus 100 may determine the information on the amplitude error and may adapt an amplitude of the baseband transmit signal 102 within 5 μs (or below 10 μs, below 20 μs or below 3 μs), for example. The amplitude of the baseband transmit signal 102 may be adapted by the apparatus 100 once for a predefined time slot. The predefined time slot may comprise a length of 500 μs (or below 500 μs, below 400 μs, below 300 μs, below 600 μs or below 1 ms). The pre-defined time slot may be used for transmitting 2-10 symbols (e.g. 5-6 symbols for long term evolution).

Figure 2:
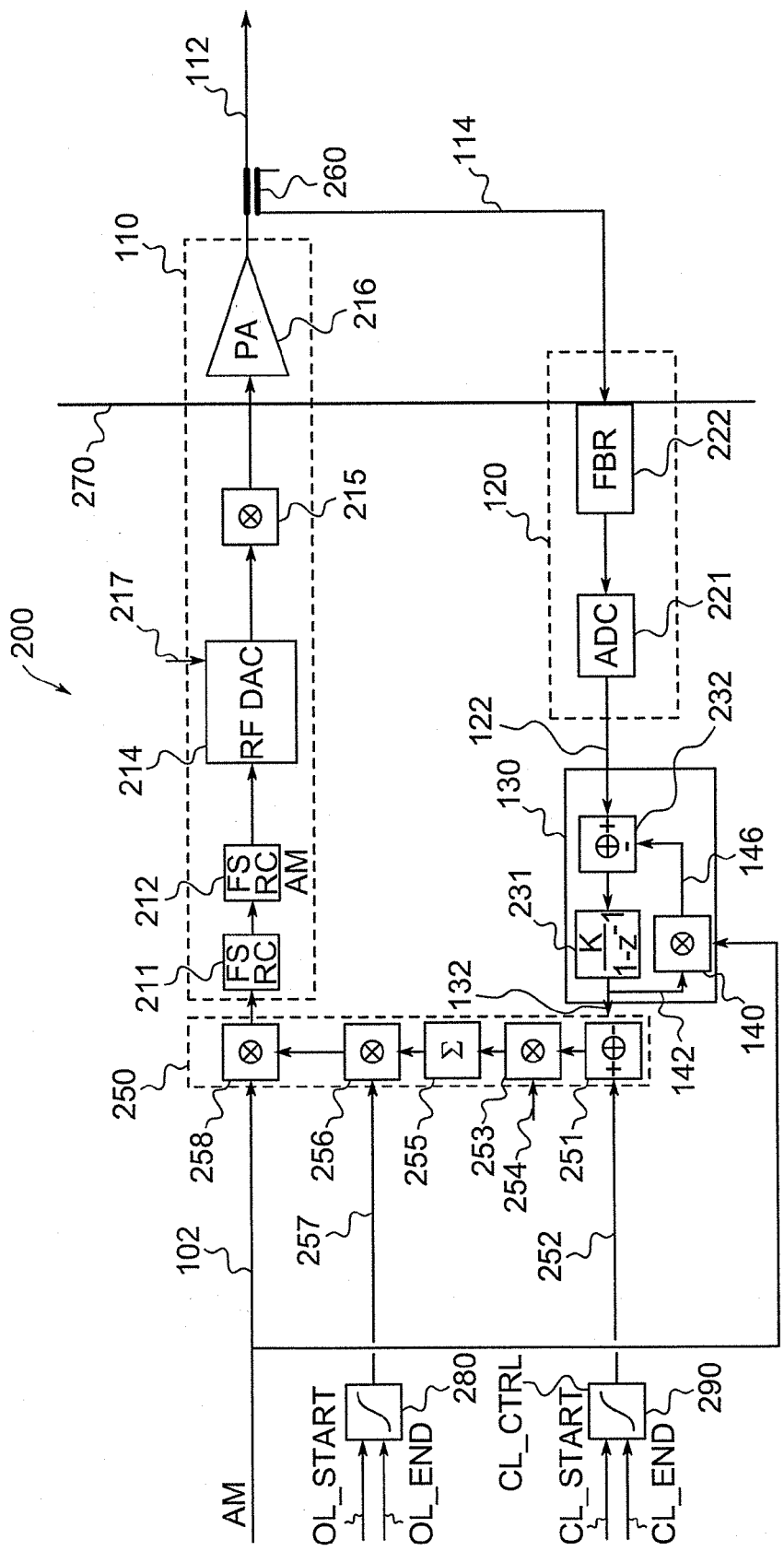
FIG. 2 shows a block diagram of an apparatus for determining information on an amplitude error of a transmit with a multiplier module within the feedback loop.

FIG. 2 shows a block diagram of an apparatus 200 for determining information on an amplitude error of a transmit signal according to an example. The implementation of the apparatus 100 is similar to the implementation shown in FIG. 1. In this example, the baseband transmit signal 102 and the baseband feedback signal 122 are amplitude signals of polar-modulated baseband signals. The apparatus 200 comprises a transmit path module 110 connected to an input port of a directional coupler 260. The directional coupler 260 is connectable to an antenna module with an output port and is connected to the feedback receive path module 120 with a coupled port. The feedback receive path module 120 is connected to the error determining module 130 and a (amplitude) control module 250 is connected to the transmit path module 110 and the error determining module 130. The baseband transmit signal 102 is provided to an input of the error determining module 130 and the (amplitude) control module 250. The (amplitude) control module 250 modifies an amplitude of the baseband transmit signal 102 based on the error signal 132 and provides an amplitude adapted baseband transmit signal to the transmit path module 110.

The transmit path module 110 comprises in the direction of the signal processing a first fractional sample rate converter FS RC 211 (e.g. for a first clock domain transition), a second fractional sample rate converter FS RC 212 (e.g. for a second clock domain transition), a Radio Frequency Digital-to-Analog converter (RF DAC) 214 with an input for a digital-to-analog converter clock signal 217 (e.g. C-DAC with 12 db dynamic), a mixer module 215 (e.g. for mixing the amplitude signal with a phase modulated local oscillator signal) 215 and a Power-Amplifier 216 (PA). The transmit path module 110 may comprise one or more additional elements (e.g. filter).

The feedback receive path module 120 comprises in the direction of the signal processing at least a feedback receiver FBR 222 (e.g. for down-converting the high frequency feedback signal) and an analog-to-digital converter ADC 221. The feedback receive path module 120 may comprise one or more optional additional elements (e.g. filter or low noise amplifier).

The feedback loop processing module 140 is implemented by a multiplier module multiplying the feedback loop input signal 142 with the baseband transmit signal 102 or a baseband signal derived from the baseband transmit signal 102 in the baseband domain to generate a multiplier output signal representing the feedback loop output signal 146. Further, the error determining module 130 comprises a first comparing module (e.g. subtracting module) 232 comparing and removing (or subtracting) the feedback loop output signal 146 from the baseband feedback signal 122 or a signal derived from the baseband feedback signal 122 to generate a first comparing (or subtracting) module output signal. In other words, in some examples, the error determining module 130 comprises a subtracting module 232 to subtract the feedback loop output signal 146 from a baseband signal comprising information on the baseband feedback signal 122 to generate a subtracting module output signal.

Further, the error determining module 130 comprises a second comparing module (e.g. summing module) 231 determining a sum or an integral of succeeding samples of the first comparing (or subtracting) module output signal (e.g. implemented by a $K/(1-z^{-1})$ element). In other words, in some examples, the error determining module 130 may comprise a summing module 231 determining a sum or an integral over the subtracting module output signal.

For example, the error determining module 130 may be implemented by an infinite impulse response IIR-filter. In other words, the error signal 132 may be determined by an IIR-filter based on the baseband transmit signal 102 and the baseband feedback signal 122.

The error compensation module 130 may be an amplitude AM remover and low-pass, for example. For example, the multiplier module 258 of the amplitude control module 250 and the first fractional sample rate converter 211 may operate at a frequency of 4×153.6 MHZ, for example.

The (amplitude control) module 250 comprises a combiner module (e.g. multiplier module) 258 combining (or multiplying) the baseband transmit signal 102 with the error signal 132 or a signal derived from the error signal 132 to generate an amplitude adapted baseband transmit signal. The amplitude control module 250 provides the amplitude adapted baseband transmit signal to the transmit path module 110 so that the high frequency transmit signal 112 is based on the amplitude adapted baseband transmit signal. In other words, in some examples, the amplitude control module 250 may at least comprise a multiplier module 258 multiplying the baseband transmit signal 102 with a baseband signal comprising information on the error signal 132 to generate an amplitude adapted baseband transmit signal. Consequently, the high frequency transmit signal 112 is based on the amplitude adapted baseband transmit signal.

Further, the amplitude control module 250 comprises a feedback gain compensation module 251 implemented by an adder or a subtractor generating a feedback gain compensation error signal based on an addition of the error signal 132 or a signal derived from the error signal 132 and a feedback gain signal 252 or a subtraction of the error signal 132 or a signal derived from the error signal 132 or a signal derived from the error signal 132 from a feedback gain signal 252. In other words, in some examples, the amplitude control module 250 comprises a feedback gain compensation module 251 generating a feedback gain compensated error signal based on an addition of a baseband signal comprising information on the error signal 132 and a feedback gain signal 252 or a subtraction of a baseband signal comprising information on the error signal 132 from a feedback gain signal 252.

The feedback gain compensation error signal may comprise a factor or a value obtained from a memory unit (e.g. stored in a look up table) or determined based on a pre-defined formula approximating or giving feedback gain values based on a current transceiver state and/or desired amplitude.

The feedback gain signal 252 may contain information on a gain of the signal path from the multiplier 258 of the amplitude control module 250 through the transmit path module 110, through the feedback receive path module 120 and the error determining module 130, for example. In this way, a gain caused by the elements of the signal path of the feedback may be compensated. The feedback gain signal 252 may depend on a state of the apparatus 200 or a desired amplitude of the high frequency transmit signal 112, for example. Additionally, the feedback gain signal 252 may be influenced by a closed loop ramp control module 290. The closed loop ramp control module 290 may smooth a transition between different amplitude levels in a closed loop state (e.g. when the error signal is considered for the adaptation of the amplitude of the baseband transmit signal) based on a closed loop start signal CL_Start (e.g. containing information on start time of a transition) and a closed loop end signal CL_End (e.g. comprising information on an end of a transition), for example.

Further, the amplitude control module 250 comprises a loop gain multiplier module 253 generating a gain adapted error signal based on the error signal 132 or a signal derived from the error signal (e.g. the feedback gain compensated error signal) and a loop gain control signal 254 (e.g. containing information on a loop gain factor). In other words, in some examples, the amplitude control module 250 may comprise a loop gain multiplier module 253 generating a gain adapted error signal based on a baseband signal comprising information on the error signal 132 and a loop gain control signal 254. By multiplying the baseband signal comprising information on the error signal 132 by a real number contained by the loop gain control signal, an additional power amplitude control (e.g. additional to the error signal based control) can be implemented, for example. For example, the loop gain control signal 254 may depend on a transceiver state (e.g. open loop or closed loop state) and/or a desired amplitude of the high frequency transmit signal 112.

Further, the amplitude control module 250 comprises a comparing module (e.g. summing module or integrator module) 255 determining a sum or an integral of succeeding samples of the error signal 132 or a signal derived from the error signal 132 (e.g. gain adapted error signal or feedback gain compensated error signal) to generate an integrated error signal. In other words, the amplitude control module 250 may comprise a summing module 255 determining a sum or an integral of succeeding samples of a baseband signal comprising information on the error signal 132.

Additionally, the amplitude control module 250 comprises an open loop gain module 256 implemented by a multiplier module multiplying an open loop error signal with an open loop gain control signal 257 to generate an open loop gain error signal. The open loop error signal may be based on the error signal 132 or a signal derived from the error signal 132 or may be a reference error signal of an open loop state of the apparatus 200 (e.g. since a signal strength of the baseband feedback signal is too low for the determination of the error signal).

Additionally, the open loop gain control signal 257 may be influenced by a second closed loop ramp control module 280. The second closed loop ramp control module 280 may smooth a transition between different amplitude levels in a closed loop state (e.g. when the error signal is considered for the adaptation of the amplitude of the baseband transmit signal) based on a closed loop start signal CL_Start (e.g. containing information on start time of a transition) and a closed loop end signal CL_End (e.g. comprising information on an end of a transition), for example.

Alternatively, the apparatus 200 may be implemented without the modules 280 and 290, for example.

More details and aspects may be explained in connection with FIG. 1. In other words, the apparatus 200 may comprise one or more additional optional features corresponding to one or more aspects mentioned in connection with the described concept or one or more examples described above.

Figure 3:
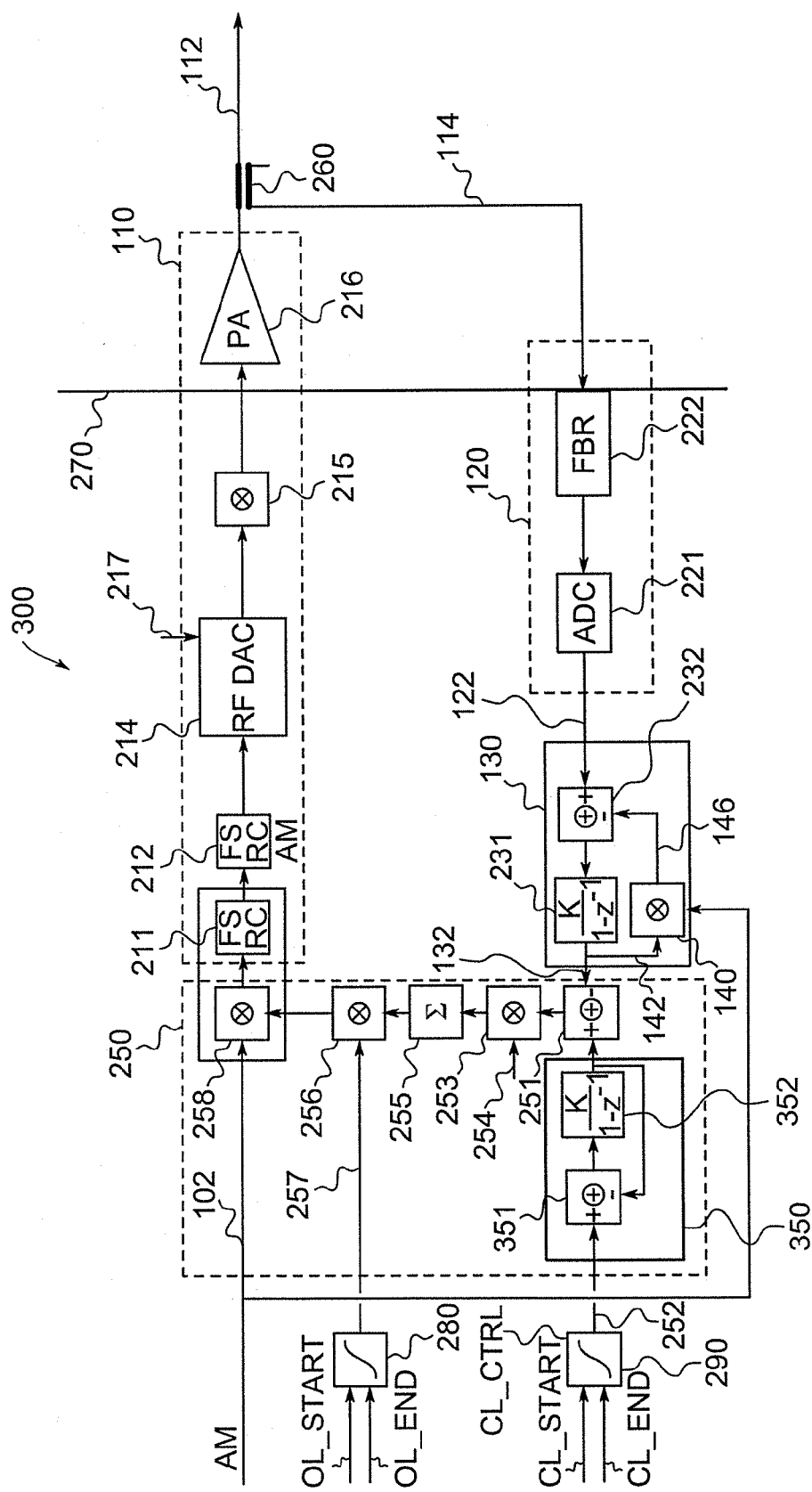
FIG. 3 shows a block diagram of an apparatus for determining information on an amplitude error of a transmit signal with a reference signal module.

FIG. 3 shows a block diagram of an apparatus 300 for determining information on an amplitude error of a transmit signal according to an example. The implementation of the apparatus 300 is similar to the implementation shown in FIG. 2.

Additionally, the amplitude control module 250 comprises a signal generation module (or reference signal module) 350 generating in combination with the feedback gain compensation module 251 a corrected error signal based on an addition of a baseband signal comprising information on the error signal 132 and a reference signal or a subtraction of a baseband signal comprising information on the error signal 132 from a reference signal. The reference signal may be based on a feedback gain signal 252 mentioned in connection with FIG. 2. The feedback gain signal 252 is provided to a subtracting module 351 subtracting a feedback loop signal of the reference signal module 350 derived at the node closer to an output of the reference signal module 350 than the subtracting module 351 to generate an output signal of the subtracting module 351. Further, the reference signal module 350 comprises a summing module 352 determining a sum or an integral of succeeding samples of the output signal of the subtracting module 351 of the reference signal module 350 and provides the sum signal to the feedback gain compensation module 251. The reference signal module may be implemented by an infinite impulse response IIR-filter, for example.

The reference signal module 350 may be a low-pass, for example.

More details and aspects are explained in connection with FIGS. 1 and 2. In other words, the apparatus 300 may comprise one or more additional optional features corresponding to one or more aspects mentioned in connection with the proposed concept or one or more examples described above.

Figure 4:
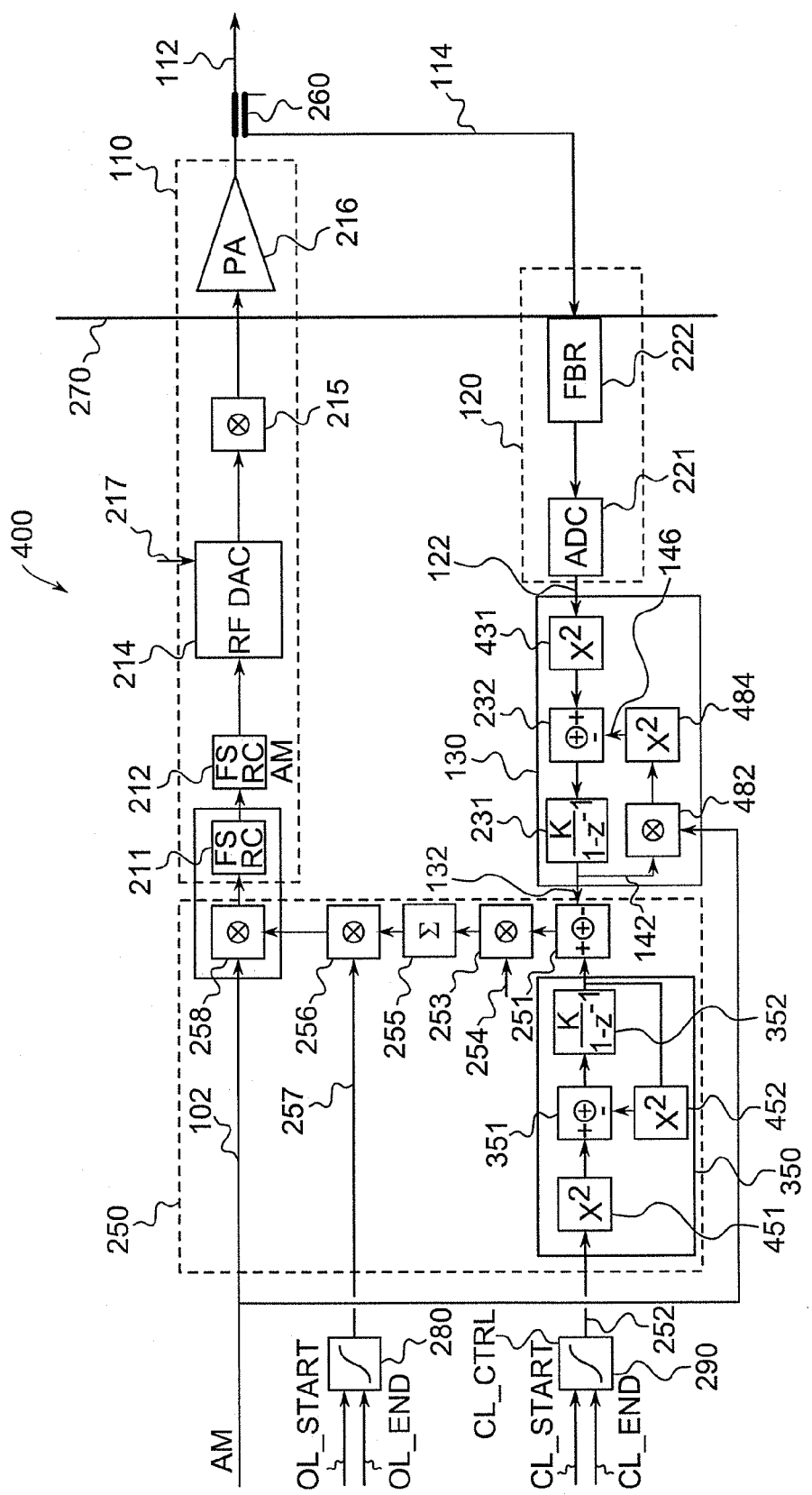
FIG. 4 shows a block diagram of an apparatus for determining information on an amplitude error of the transmit signal with a reference digital root mean square module.

FIG. 4 shows a block diagram of an apparatus 400 for determining information on an amplitude error of a transmit signal according to an example. The implementation of the apparatus 400 is similar to the implementation shown in FIG. 3. Additionally, the error determining module 130 comprises a first calculation module (e.g. input squaring module) 431 to calculate a square of the baseband feedback signal 122 or a signal derived from the baseband feedback signal 122 to generate a first calculation (input squaring) module output signal to be provided to the subtracting module 232. In other words, in some examples, the error determining module 130 comprises an input squaring module 431 squaring a baseband signal comprising information on the baseband feedback signal 122 to generate an input squaring module output signal.

Further, the feedback loop processing module comprises a second calculation module (e.g. loop squaring module) 484 following the multiplier module 482 of the feedback loop processing module. The loop squaring module squares the multiplier output signal to generate a second calculation (loop squaring) module output signal representing the feedback loop output signal 146 provided to the subtracting module 232. In other words, in some examples, the feedback loop processing module comprises a loop squaring module 484 squaring the multiplier output signal to generate a loop squaring module output signal.

Additionally, the reference signal module 350 comprises a corresponding input squaring module 451 and a corresponding loop squaring module 452. For example, the reference signal module 350 comprises or implements a reference digital root mean square module digrms to generate the reference signal. In comparison, the error determining module 130 may implement a digital root mean square module digrms with an additional multiplier module 482 within the feedback loop, for example. The digital root mean square module may be a non-linear processing module, for example.

Alternatively, the apparatus 400 may be implemented without the reference signal module 350.

The error compensation module 130 may be an amplitude AM remover and digital root mean square digrms module, for example.

More details and aspects may be mentioned in connection with FIGS. 2 and 3. In other words, the apparatus 400 may comprise one or more additional optional features corresponding to one or more aspects mentioned in connection with the proposed concept or one or more examples described above.

Some examples relate to a power control with amplitude modulation compensation in a measurement path, for example. A proposed apparatus may be embodied in products with high volume architecture or other than high volume architectures. This may encompass test systems and/or design/debug tools, for example.

A proposed apparatus may implement a multimode power control loop for uplink cellular transmission able to cope with signals having strong amplitude modulation and different modulation schemes, showing a variety of different crest factors and also different spectral contents. Such signals may range from very narrow band signals like LTE (Long Term Evolution) with single resource block occupation to LTE 20 (widest band width BW) full avocation or DC-HSPA+ (Dual-Carrier High-Speed Packet Access Plus, highest crest factor). The loop may be very fast in order to avoid or reduce introduction of settling ripple in the wanted part of the signal but may also be robust against the AM modulation, for example.

A proposed system may be regulated to a root mean square RMS value (e.g. with a relatively long observation time, the slot, in the range of 500 or 666 µs) within the time allowed or used for the power to change (e.g. 5-20 µs). During this time, the instantaneous AM modulation may significantly impact output power, especially in LTE when only one or very few resource blocks are used, for example.

In comparison, an I-control loop (integrative loop) with digital RMS extraction may be used. The digrms blocks may perform the RMS extraction on the fly by taking the square root of the averaged square signal. These blocks are non-linear blocks but their behavior may be approximated to the one of the low-pass filter. Averaging may be achieved through HR-filtering, which means that the digrms have a feedback structure. Their band width BW may be a tradeoff between the desire to remove the amplitude modulation and the stability of the loop. The residual modulation breaking through the digrms blocks may be taken into account by applying an ideal modulation at a reference path as well. There may be two digrms blocks, one within the measurement path and one on the reference path. The one on the reference may be used to ensure that the reference signal does not anticipate the measured signal and to apply same filtering condition to the amplitude as in the measurement, for example.

With the proposed apparatus, the power may be quickly and accurately measured during open loop, at power levels approaching the threshold at which it may switched into close loop (e.g. around −5 to 0 dBm). The digrms band width BW may be programmed to be quite narrow to suppress the modulation, but the block may require a long settling time. The removal or reduction of amplitude modulation AM in reference path may be insufficient, as the system may be running in an open loop mode, for example. With the proposed apparatus, a doubling of the digrms circuitry may be avoided. Further, the band width of the control loop may be a function of instantaneous AM signal, for example. A proposed apparatus may cope with such signals having strong low frequency AM content (e.g. LTE with few resource blocks or UMTS modulation test case 4), for example.

A digital suppression of AM noise may be done by dividing the incoming signal from the measurement path by the normalized amplitude. However, a digital divider may need to run at high speed (e.g. 26 MHZ currently or 38.4/30 MHZ in future or another frequency), which may occupy a large silicon area, draw a lot of current and/or introduce extra delay (e.g. a delay in a control loop may mean loss in phase margin, which may reduce the stability).

A proposed apparatus may use the implementation of multiplication in the digrms feedback branch or the feedback branch of the error determining module, which may be equivalent to a diversion. In other words, a divider modular digital divider within the error determining module may be avoided. Some examples are shown in FIG. 1-4.

Figure 5:
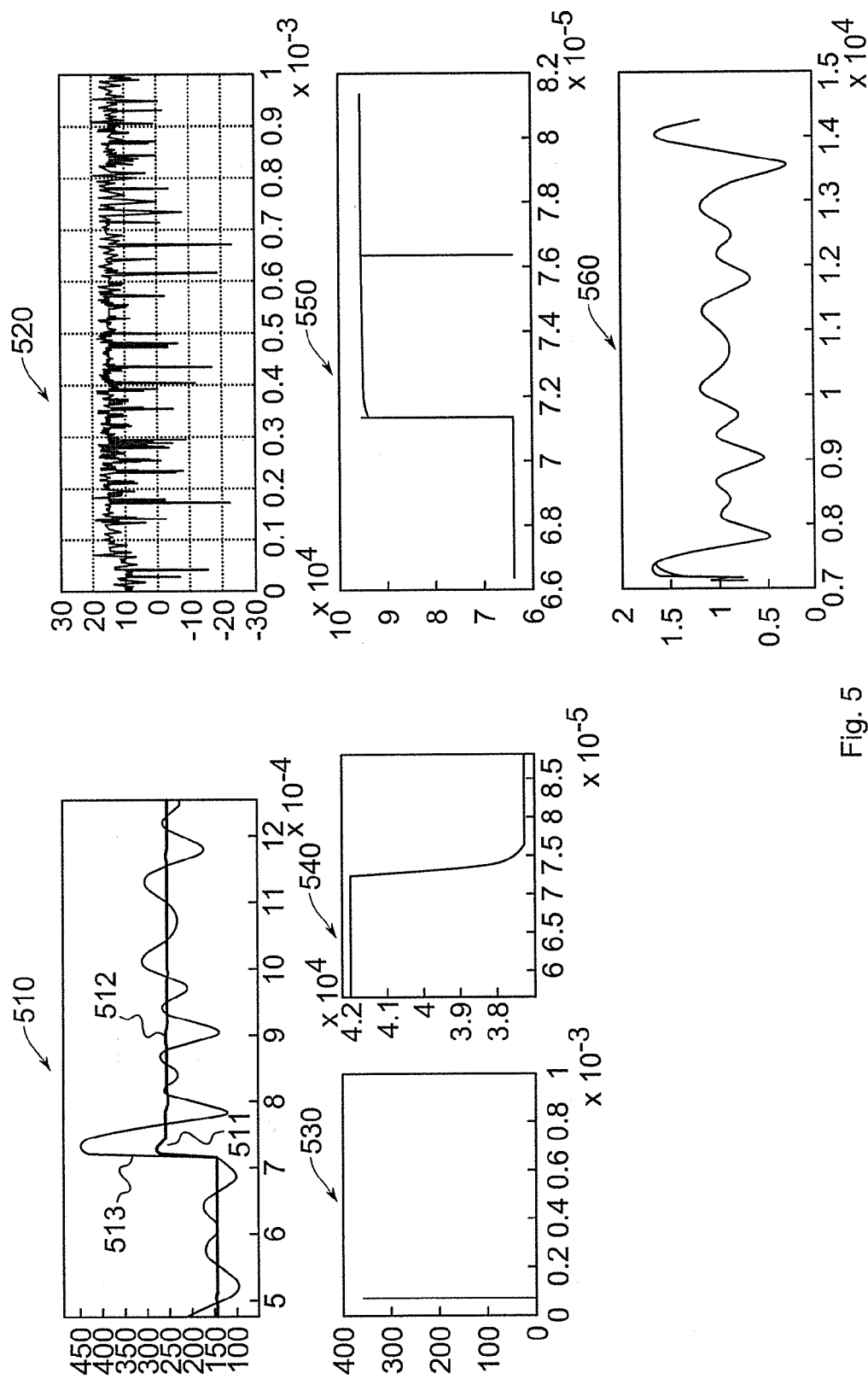
FIG. 5 shows examples of simulation results.

FIG. 5 shows an illustration of simulation results for a power transition from 10-15 dBm with LTE one resource block one RB (resource block), for example. The first diagram 510 indicates an amplitude over time for an output 511 of the reference signal module, an error signal 512 equal to an output of the summing module of the error determining module and the baseband feedback signal 513. The simulations are based on an apparatus shown in FIG. 4, but may also apply to other examples. The error signal or output of the digrms block is not or only very weak effected by the AM content (e.g. just some residual ripple may break through although the simulation may take into account a mismatch of 30 ns between the delay of the duplexer and feedback path and the AM compensation branch), for example. The second diagram 520 indicates an amplitude over time of a high frequency transmit signal pout. Further, the third diagram 530 indicates an amplitude over time of a loop gain control signal kloop (e.g. which may be unequal to 0 only for a short time). Furthermore, the fourth diagram 540 indicates an output of the summing module or integrator module of the amplitude control module. Additionally, the fifth diagram 550 indicates an amplitude over time of an open loop gain control signal (Ramp—open loop scalar) applied to the open loop gain module of the amplitude control module. Further, the sixth diagram 560 indicates an amplitude over time of another high frequency transmit signal (impact of ramping on first symbol).

The simulations show a step from 10-15 dBm with the digrms exponent of 1 and the ramping time from 71.4-76.4 in. Further, the power amplifier PA gain is 16.5-19 db expecting 16.5-18 db with a change at time stamp 71.4 µs. Further, the power reached is 14.95 dBm with an internal measurement of 14.97 dBm and a length of measurement of 1000 µs. The duplexer delay is 100 is and the compensated duplexer delay is 70 µs. The digrmsa band width BW setting is 6 and the digrmsa cutoff frequency is 400 kHz. Further, the loop band width BW is 144 kHz with a phase margin of 64°. Additionally, the amplitude error vector magnitude EVM is 2.3%.

With the proposed apparatus, the accuracy of the loop can be greatly improved even in extremely challenging scenarios like those in the simulations, where the loop is allowed to run only 4 is long, for example. The power reached in the simulation is 14.95 dBm (e.g. impairments inaccuracy due to feedback receiver FBR drift or calibration errors are not considered). The simulation shows an improvement of the power control loop.

A proposed apparatus may implement a power control loop in which the instantaneous AM modulation may be compensated for in the measurement path without making use of digital dividers, but through multiplication in the feedback chain of a digrms block (or more general an error determining module) or of an HR digital filter, for example.

A proposed apparatus may implement a modulation system with a digital power control loop which operates in short times (e.g. below 5 µs) and cope with signals whose AM modulation has significant amount of energy (e.g. power error of more than 0.1 dB) at low frequency (e.g. even so that $t_{loop}$</$BW_{signal}$ band width of signal). Further, the digital power control loop may comprise a compensation of AM in the loop measurement path. This compensation does not make use dividers, for example. This compensation may make use of multipliers within a digrms (or alternatively with an HR-filter) block in the measurement path. Further, the multipliers may be located in the feedback path of the above mentioned digrms/filter.

Some examples relate to an apparatus for determining information on an amplitude error of a transmit signal. The apparatus comprises means for generating a high frequency transmit signal configured to generate a high frequency transmit signal based on a baseband transmit signal and means for generating a baseband feedback signal configured to generate a baseband feedback signal based on a high frequency feedback signal derived from the high frequency transmit signal. Further, the apparatus comprises means for generating an error signal configured to determine an error signal indicating information associated with an amplitude error of the high frequency transmit signal based on the baseband transmit signal and the baseband feedback signal. Further, the means for generating an error signal comprises a feedback loop, the feedback loop of the means for generating an error signal comprises means for generating a feedback loop output signal configured to generate a feedback loop output signal based on a feedback loop input signal and the baseband transmit signal.

The apparatus may comprise one or more additional optional features corresponding to one or more aspects mentioned in connection with the proposed concept or one or more examples described above.

Some examples relate to a transmitter or transceiver comprising an apparatus for determining information on an amplitude error of a transmit signal according to the proposed concept or one or more examples described above. For example, a radio frequency (RF) device (e.g. a cell phone, a Base Station or another RF communication device) may comprise such a transmitter or a transceiver. A proposed transmitter or transceiver may be used in mobile communication applications, terrestrial broadcasting applications, satellite communication applications, line-of-sight radio applications or radio remote control applications.

Further examples relate to a mobile device (e.g. a cell phone, a tablet or a laptop) comprising a transmitter or a transceiver described above. The mobile device or mobile terminal may be used for communicating in a mobile communication system.

Figure 6:
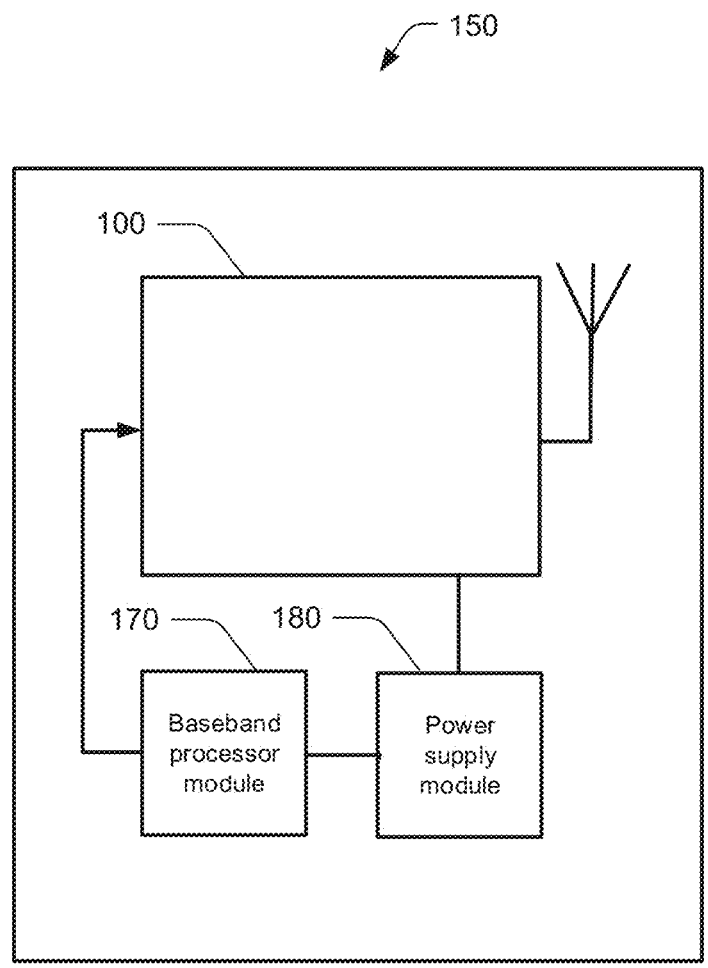
FIG. 6 shows a block diagram of a mobile device.

FIG. 6 shows a schematic illustration of a mobile device 150 according to an example. The mobile device comprises an apparatus 100 for determining information on an amplitude error of a transmit signal as described in connection with the proposed concept or one or more examples described above. Further, the mobile device 150 comprises a baseband processor module 170 generating a baseband transmit signal and provides the baseband transmit signal to the apparatus 100. Additionally, the mobile device comprises a power supply unit 180 supplying at least the apparatus 100 and the baseband processor module 170 with power. Further, the mobile device 150 comprises an antenna connected to the apparatus 100 for transmitting the high frequency transmit signal provided by the apparatus 100.

In some examples, a cell phone may comprise a transmitter or a transceiver comprising an apparatus for determining information on an amplitude error of a transmit signal according to the proposed concept or one or more examples described above.

Further, some examples relate to a base station or a relay station of a mobile communication system comprising a transmitter or a transceiver with an apparatus for determining information on an amplitude error of a transmit signal according to the described concept or one or more examples described above.

A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc.

Figure 7:
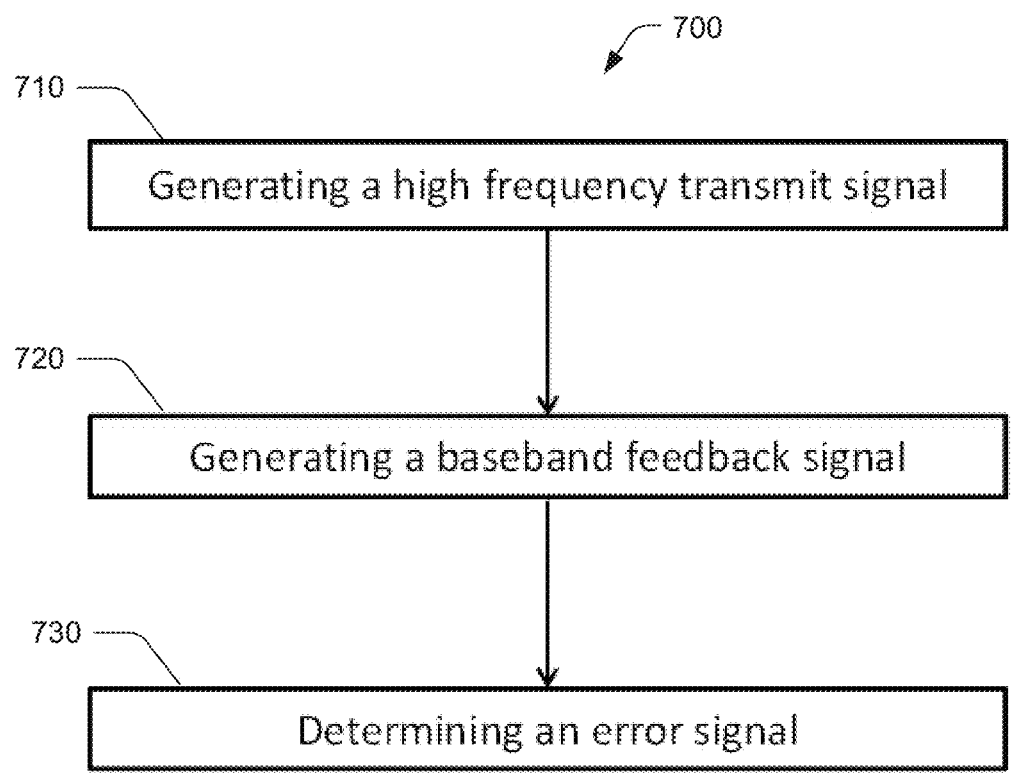
FIG. 7 shows a flow chart of a method for determining information on an amplitude error of a transmit signal.

FIG. 7 shows a flow chart of a method 700 for determining information on an amplitude error of a transmit signal according to an example. The method 700 comprises generating 710 a high frequency transmit signal based on a baseband transmit signal and generating 720 a baseband feedback signal based on a high frequency feedback signal derived from the high frequency transmit signal. Further, the method 700 comprises determining 730 an error signal indicating information associated with an amplitude error of the high frequency transmit signal based on the baseband transmit signal and the baseband feedback signal by an error determining module. The method 700 further comprises generating a feedback loop output signal based on a feedback loop input signal and the baseband transmit signal by a feedback loop processing module within a feedback loop of the error determining module. In other words, the error determining module comprises a feedback loop and the feedback loop of the error determining module comprises a feedback loop processing module configured to generate a feedback loop output signal based on a feedback loop input signal and the baseband transmit signal.

The apparatus may comprise one or more additional optional acts corresponding to one or more aspects mentioned in connection with the proposed concept or one or more examples described above.

In the following examples pertain to further examples. Example 1 is an apparatus for determining information on an amplitude error of a transmit signal, the apparatus comprising a transmit path module configured to generate a high frequency transmit signal based on a baseband transmit signal, a feedback receive path module configured to generate a baseband feedback signal based on a high frequency feedback signal derived from the high frequency transmit signal and an error determining module configured to determine an error signal indicating information associated with an amplitude error of the high frequency transmit signal based on the baseband transmit signal and the baseband feedback signal, wherein the error determining module comprises a feedback loop, wherein the feedback loop of the error determining module comprises a feedback loop processing module configured to generate a feedback loop output signal based on a feedback loop input signal and the baseband transmit signal.

In example 2, the subject matter of example 1 can optionally include the feedback loop processing module comprising a multiplier module configured to generate a multiplier output signal based on the feedback loop input signal and the baseband transmit signal.

In example 3, the subject matter of example 2 can optionally include the multiplier module configured to multiply the feedback loop input signal with a baseband signal comprising information on the baseband transmit signal in the baseband domain to generate the multiplier output signal.

In example 4, the subject matter of any one of examples 1-3 can optionally include the error determining module comprising a subtracting module configured to subtract the feedback loop output signal from a baseband signal comprising information on the baseband feedback signal to generate a subtracting module output signal.

In example 5, the subject matter of example 4 can optionally include the error determining module comprising a summing module configured to determine a sum or an integral of succeeding samples of the subtracting module output signal.

In example 6, the subject matter of example 4 or 5 can optionally include the error determining module comprising an input squaring module configured to square a baseband signal comprising information on the baseband feedback signal to generate an input squaring module output signal.

In example 7, the subject matter of any one of examples 2-6 can optionally include the feedback loop processing module comprising a loop squaring module configured to square the multiplier output signal to generate a loop squaring module output signal.

In example 8, the subject matter of any one of examples 1-7 can optionally include the baseband transmit signal being an amplitude signal of a polar modulated baseband transmit signal.

In example 9, the subject matter of any one of examples 1-8 can optionally include the baseband feedback signal being an amplitude signal of a polar modulated baseband feedback signal.

In example 10, the subject matter of any one of examples 1-9 can optionally include an amplitude control module configured to control an amplitude of the high frequency transmit signal based on the error signal.

In example 11, the subject matter of example 10 can optionally include the amplitude control module comprising a multiplier module configured to multiply the baseband transmit signal with a baseband signal comprising information on the error signal to generate an amplitude adapted baseband transmit signal, wherein the high frequency transmit signal is based on the amplitude adapted baseband transmit signal.

In example 12, the subject matter of example 10 or 11 can optionally include the amplitude control module comprising a feedback gain compensation module configured to generate a feedback gain compensated error signal based on an addition of a baseband signal comprising information on the error signal and a feedback gain signal or a subtraction of a baseband signal comprising information on the error signal from a feedback gain signal.

In example 13, the subject matter of any one of examples 10 to 12 can optionally include the amplitude control module comprising a reference signal module configured to generate a corrected error signal based on an addition of a baseband signal comprising information on the error signal and a reference signal or a subtraction of a baseband signal comprising information on the error signal from a reference signal.

In example 14, the subject matter of example 13 can optionally be configured including the reference signal module comprising a reference digital root-mean-square module configured to generate the reference signal.

In example 15, the subject matter of any one of examples 10 to 14 can optionally including the amplitude control module comprising a loop gain multiplier module configured to generate a gain adapted error signal based on a baseband signal comprising information on the error signal and a loop gain control signal.

In example 16, the subject matter of any one of examples 10 to 15 can optionally including the amplitude control module comprising a summing module configured to determine a sum or an integral of succeeding samples of a baseband signal comprising information on the error signal to generate an integrated error signal.

In example 17, the subject matter of any one of examples 10 to 16 can optionally include the amplitude control module comprising an open loop gain module configured to multiply an open loop error signal with an open loop gain control signal to generate an open loop gain error signal.

In example 18, the subject matter of any one of examples 11 to 17 can optionally include a loop control module configured to activate or deactivate an adaptation of an amplitude of the high frequency transmit signal based on the error signal.

In example 19, the subject matter of example 18 can optionally include the loop control module configured to deactivate the adaptation of an amplitude of the high frequency transmit signal, if a current power of the high frequency transmit signal is below a predefined power threshold.

In example 20, the subject matter of any one of examples 1 to 19 can optionally include a directional coupler configured to derive the high frequency feedback signal from the high frequency transmit signal.

In example 21, the subject matter of any one of examples 1 to 20 can optionally include the error determining module being located in the digital domain.

In example 22, the subject matter of any one of examples 1 to 21 can optionally include the error determining module generating the error signal without a signal divider.

Example 23 is an apparatus for determining information on an amplitude error of a transmit signal, the apparatus comprising means for generating a high frequency transmit signal configured to generate a high frequency transmit signal based on a baseband transmit signal, means for generating a baseband feedback signal configured to generate a baseband feedback signal based on a high frequency feedback signal derived from the high frequency transmit signal and means for generating an error signal configured to determine an error signal indicating information associated with an amplitude error of the high frequency transmit signal based on the baseband transmit signal and the baseband feedback signal, wherein means for generating an error signal comprises a feedback loop, wherein the feedback loop of the means for generating an error signal comprises means for generating a feedback loop output signal configured to generate a feedback loop output signal based on a feedback loop input signal and the baseband transmit signal.

In example 24, the subject matter of example 23 can optionally include the means for generating a feedback loop output signal comprising a means for multiplying configured to generate a multiplier output signal based on the feedback loop input signal and the baseband transmit signal.

Example 25 is transmitter or a transceiver comprising an apparatus according the subject matter of any of the previous examples.

Example 26 is a mobile device comprising a transmitter, a receiver or a transceiver according to example 25.

Example 27 is a cell phone comprising a transmitter, a receiver or a transceiver according to example 25.

Example 28 is a method for determining information on an amplitude error of a transmit signal, the method comprising generating a high frequency transmit signal based on a baseband transmit signal, generating a baseband feedback signal based on a high frequency feedback signal derived from the high frequency transmit signal and determining an error signal indicating information associated with an amplitude error of the high frequency transmit signal based on the baseband transmit signal and the baseband feedback signal by an error determining module, wherein the error determining module comprises a feedback loop, wherein the feedback loop of the error determining module comprises a feedback loop processing module configured to generate a feedback loop output signal based on a feedback loop input signal and the baseband transmit signal.

In example 29, the subject matter of example 28 can optionally include generating a multiplier output signal based on the feedback loop input signal and the baseband transmit signal by a multiplier module of the feedback loop processing module.

In example 30, the subject matter of example 28 can optionally comprise generating the combined output signal by combining the feedback loop input signal with a baseband signal comprising information on the baseband transmit signal in the baseband domain.

In example 31, the subject matter of example 28 to 30 can optionally comprise comparing and removing the feedback loop output signal from a baseband signal comprising information on the baseband feedback signal to generate a first comparing module output signal.

In example 32, the subject matter of example 31 can optionally comprise determining a sum or an integral of succeeding samples of the first comparing module output signal.

In example 33, the subject matter of example 31 to 32 can optionally comprise calculating a square of a baseband signal comprising information on the baseband feedback signal to generate a first calculation module output signal.

In example 34, the subject matter of one of the examples 29 to 33 can optionally comprise calculating a square of the combined output signal to generate a second calculation module output signal.

In example 35, the subject matter of one of the examples 28 to 34 the baseband transmit signal can optionally be an amplitude signal of a polar modulated baseband transmit signal.

In example 36, the subject matter of one of the examples 28 to 35 the baseband feedback signal can optionally be an amplitude signal of a polar modulated baseband feedback signal.

In example 37, the subject matter of one of the examples 28 to 36 can optionally comprise controlling an amplitude of the high frequency transmit signal based on the error signal.

In example 38, the subject matter of example 37 can optionally comprise combining the baseband transmit signal with a baseband signal comprising information on the error signal to generate an amplitude adapted baseband transmit signal, wherein the high frequency transmit signal is based on the amplitude adapted baseband transmit signal.

In example 39, the subject matter of one of the examples 37 to 38 can optionally comprise generating a feedback gain compensated error signal based on an addition of a baseband signal comprising information on the error signal and a feedback gain signal or a subtraction of a baseband signal comprising information on the error signal from a feedback gain signal.

In example 40, the subject matter of one of the examples 37 to 39 can optionally comprise generating a corrected error signal based on an addition of a baseband signal comprising information on the error signal and a reference signal or a subtraction of a baseband signal comprising information on the error signal from a reference signal.

In example 41, the subject matter of one of the examples 37 to 40 can optionally comprise generating a gain adapted error signal based on a baseband signal comprising information on the error signal and a loop gain control signal.

In example 42, the subject matter of one of the examples 37 to 41 can optionally comprise determining a sum or an integral of succeeding samples of a baseband signal comprising information on the error signal to generate an integrated error signal.

In example 43, the subject matter of one of the examples 37 to 42 can optionally comprise multiplying an open loop error signal with an open loop gain control signal to generate an open loop gain error signal.

In example 44, the subject matter of one of the examples 27 to 43 can optionally comprise activating or deactivating an adaptation of an amplitude of the high frequency transmit signal based on the error signal.

In example 45, the subject matter of example 44 can optionally comprise deactivating the adaptation of an amplitude of the high frequency transmit signal, if a current power of the high frequency transmit signal is below a predefined power threshold.

Example 46 is a machine readable storage medium including program code, when executed, to cause a machine to perform the method of example 28.

Example 47 is a machine readable storage including machine readable instructions, when executed, to implement a method or realize an apparatus as implemented by any one of examples 1-29.

Example 48 is a computer program having a program code for performing the method of example 28, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. An apparatus for determining information on an amplitude error of a transmit signal, the apparatus comprising:
   a transmit path circuit configured to generate a high frequency transmit signal based on a baseband transmit signal;
   a feedback receive path circuit configured to generate a baseband feedback signal based on a high frequency feedback signal derived from the high frequency transmit signal;
   an error determining circuit configured to determine an error signal indicating information associated with an amplitude error of the high frequency transmit signal based on the transmit signal and the baseband feedback signal, wherein the error determining circuit comprises a feedback loop, wherein the feedback loop of the error determining circuit comprises a feedback loop processing circuit configured to generate a feedback loop output signal based on a feedback loop input signal and the baseband transmit signal; and
   a loop control circuit configured to activate or deactivate an adaptation of an amplitude of the high frequency transmit signal based on the error signal.

2. The apparatus according to claim 1, wherein the feedback loop processing circuit comprises a combiner circuit configured to generate a combined output signal based on the feedback loop input signal and the baseband transmit signal.

3. The apparatus according to claim 2, wherein the combiner circuit is configured to combine the feedback loop input signal with a baseband signal comprising information on the baseband transmit signal in the baseband domain to generate the combined output signal.

4. The apparatus according to claim 1, wherein the error determining circuit comprises a first comparing circuit configured to compare and remove the feedback loop output signal from a baseband signal comprising information on the baseband feedback signal to generate a first comparing circuit output signal.

5. The apparatus according to claim 4, wherein the error determining circuit comprises a second comparing circuit configured to determine a sum or an integral of succeeding samples of the first comparing circuit output signal.

6. The apparatus according to claim 4, wherein the error determining circuit comprises a first calculation circuit configured to calculate a square of a baseband signal comprising information on the baseband feedback signal to generate a first calculation circuit output signal.

7. The apparatus according to claim 2, wherein the feedback loop processing circuit comprises a second calculation circuit configured to calculate square of the combined output signal to generate a second calculation circuit output signal.

8. The apparatus according to claim 1, wherein the baseband transmit signal is an amplitude signal of a polar modulated baseband transmit signal.

9. The apparatus according to claim 1, wherein the baseband feedback signal is an amplitude signal of a polar modulated baseband feedback signal.

10. The apparatus according to claim 1, comprising a control circuit configured to control an amplitude of the high frequency transmit signal based on the error signal.

11. The apparatus according to claim 10, wherein the control circuit comprises a combiner circuit configured to combine the baseband transmit signal with a baseband signal comprising information on the error signal to generate an amplitude adapted baseband transmit signal, wherein the high frequency transmit signal is based on the amplitude adapted baseband transmit signal.

12. The apparatus according to claim 10, wherein the control circuit comprises a feedback gain compensation circuit configured to generate a feedback gain compensated error signal based on an addition of a baseband signal comprising information on the error signal and a feedback gain signal or a subtraction of a baseband signal comprising information on the error signal from a feedback gain signal.

13. The apparatus according to claim 10, wherein the control circuit comprises a signal generation circuit configured to generate a corrected error signal based on an addition of a baseband signal comprising information on the error signal and a reference signal or a subtraction of a baseband signal comprising information on the error signal from a reference signal.

14. The apparatus according to claim 13, wherein the signal generation circuit comprises a reference digital root-mean-square circuit configured to generate the reference signal.

15. The apparatus according to claim 10, wherein the control circuit comprises a loop gain multiplier circuit configured to generate a gain adapted error signal based on a baseband signal comprising information on the error signal and a loop gain control signal.

16. The apparatus according to claim 10, wherein the control circuit comprises a comparing circuit configured to determine a sum or an integral of succeeding samples of a baseband signal comprising information on the error signal to generate an integrated error signal.

17. The apparatus according to claim 1, wherein the loop control circuit is configured to deactivate the adaptation of an amplitude of the high frequency transmit signal, if a current power of the high frequency transmit signal is below a predefined power threshold.

18. The apparatus according to claim 1, comprising a directional coupler configured to derive the high frequency feedback signal from the high frequency transmit signal.

19. The apparatus according to claim 1, wherein the error determining circuit is located in the digital domain.

20. The apparatus according to claim 1, wherein the error determining circuit generates the error signal without a signal divider.

21. An apparatus for determining information on an amplitude error of a transmit signal, the apparatus comprising:
   means for generating a high frequency transmit signal, using a transmit path circuit, configured to generate a high frequency transmit signal based on a baseband transmit signal;
   means for generating a baseband feedback signal, using a feedback path receive circuit, configured to generate a baseband feedback signal based on a high frequency feedback signal derived from the high frequency transmit signal; and
   means for generating an error signal, using an error determining circuit, configured to determine an error signal indicating information associated with an amplitude error of the high frequency transmit signal based on the baseband transmit signal and the baseband feedback signal, wherein means for generating an error signal comprises a feedback loop, wherein the feedback loop of the means for generating an error signal comprises means for generating a feedback loop output signal configured to generate a feedback loop output signal based on a feedback loop input signal and the baseband transmit signal; and
   means for activating or deactivating an adaptation of an amplitude of the high frequency transmit signal, using a loop control circuit, based on the error signal.

22. A method for determining information on an amplitude error of a transmit signal, the method comprising:
- generating a high frequency transmit signal based on a baseband transmit signal using a transmit path circuit;
- generating a baseband feedback signal based on a high frequency feedback signal derived from the high frequency transmit signal using a feedback receive path circuit;
- determining an error signal indicating information associated with an amplitude error of the high frequency transmit signal based on the baseband transmit signal and the baseband feedback signal using an error determining circuit; and
- generating a feedback loop output signal based on a feedback loop input signal and the baseband transmit signal using a feedback loop processing circuit within a feedback loop of the error determining circuit; and
- activating or deactivating an adaptation of an amplitude of the high frequency transmit signal, using a loop control circuit, based on the error signal.

23. A machine readable non-transitory storage medium including program code, when executed, to cause a machine to perform the method of claim 22.

* * * * *